(12) United States Patent
Morris et al.

(10) Patent No.: US 9,138,919 B2
(45) Date of Patent: *Sep. 22, 2015

(54) METHOD FOR PRODUCING COMPOSITE LAMINATES USING A COLLAPSIBLE MANDREL

(71) Applicant: The Boeing Company, Chicago, IL (US)

(72) Inventors: John D. Morris, Seattle, WA (US); Michael A. Lee, Kent, WA (US); Kenneth L. Brook, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,440

(22) Filed: Jul. 8, 2014

(65) Prior Publication Data

US 2014/0322382 A1    Oct. 30, 2014

Related U.S. Application Data

(62) Division of application No. 13/626,064, filed on Sep. 25, 2012, now Pat. No. 8,800,953, which is a division of application No. 12/332,093, filed on Dec. 10, 2008, now Pat. No. 8,293,051.

(51) Int. Cl.
 *B29C 33/48* (2006.01)
 *B29C 70/44* (2006.01)
 *B29D 99/00* (2010.01)

(52) U.S. Cl.
 CPC ............. *B29C 33/485* (2013.01); *B29C 70/446* (2013.01); *B29D 99/001* (2013.01)

(58) Field of Classification Search
 CPC .......... B28B 7/30; B28B 7/32; B29C 33/485; B29C 33/505; B29C 53/824; B29C 70/342; B29C 70/44; B29C 70/446; B29D 99/001
 USPC ............. 249/63–64, 150–153, 177–180, 183; 156/156, 185–187, 417
 See application file for complete search history.

(56) References Cited

U.S. PATENT DOCUMENTS

| | | | |
|---|---|---|---|
| 994,643 A | | 6/1911 | Johnson |
| 2,170,188 A | * | 8/1939 | Cobi ............................. 249/65 |
| 3,072,995 A | | 1/1963 | Buxton |
| 3,266,767 A | | 8/1966 | Long |

(Continued)

FOREIGN PATENT DOCUMENTS

| | | | | |
|---|---|---|---|---|
| DE | 3911312 C1 | * | 4/1990 | ............. B29C 53/60 |
| EP | 2402134 A2 | * | 1/2012 | ............. B29C 33/40 |

(Continued)

OTHER PUBLICATIONS

Office Action, dated Jun. 16, 2011, regarding U.S. Appl. No. 12/332,093, 8 pages.

(Continued)

*Primary Examiner* — Yogendra Gupta
*Assistant Examiner* — Emmanuel S Luk
(74) *Attorney, Agent, or Firm* — Yee & Associates, P.C.

(57) ABSTRACT

A collapsible bladder has flexible outer walls and at least one strut inside the enclosure. The strut is connected to the outer walls and controls the shape into which the enclosure may be collapsed.

20 Claims, 7 Drawing Sheets

(56) References Cited

U.S. PATENT DOCUMENTS

| | | | |
|---|---|---|---|
| 3,279,740 A | 10/1966 | Long | |
| 3,656,255 A | 4/1972 | Rosenfeld | |
| 3,720,389 A | 3/1973 | Ferris | |
| 3,768,769 A | 10/1973 | Sachs | |
| 3,862,736 A * | 1/1975 | Herro | 249/65 |
| 4,119,695 A * | 10/1978 | Asserback | 264/314 |
| 4,310,138 A | 1/1982 | Johnston | |
| 4,662,587 A | 5/1987 | Whitener | |
| 4,780,262 A | 10/1988 | Vonvolkli | |
| 5,013,514 A | 5/1991 | Azzani et al. | |
| 5,106,568 A | 4/1992 | Honka | |
| 5,139,409 A * | 8/1992 | Bevan et al. | 425/417 |
| 5,259,901 A | 11/1993 | Davis et al. | |
| 5,266,137 A * | 11/1993 | Hollingsworth | 156/156 |
| 5,368,807 A | 11/1994 | Lindsay | |
| 5,382,150 A | 1/1995 | Henrio | |
| 5,387,098 A | 2/1995 | Willden | |
| 5,425,628 A | 6/1995 | Pinckney et al. | |
| 5,507,341 A | 4/1996 | Eslinger et al. | |
| 5,538,589 A | 7/1996 | Jensen et al. | |
| 5,605,195 A | 2/1997 | Eslinger et al. | |
| 5,645,668 A | 7/1997 | Lin et al. | |
| 5,707,576 A | 1/1998 | Asher | |
| 5,851,619 A | 12/1998 | Sakai et al. | |
| 6,403,179 B1 | 6/2002 | Adachi | |
| 6,692,681 B1 | 2/2004 | Lunde | |
| 6,808,154 B2 | 10/2004 | Koren | |
| 6,820,654 B2 * | 11/2004 | Lindsay | 138/153 |
| 7,083,698 B2 | 8/2006 | Engwall et al. | |
| 7,216,832 B2 | 5/2007 | Simpson et al. | |
| 7,293,737 B2 | 11/2007 | Engwall et al. | |
| 7,357,166 B2 | 4/2008 | Pham et al. | |
| 7,972,466 B2 | 7/2011 | Martinez Cerezo et al. | |
| 8,293,051 B2 * | 10/2012 | Morris et al. | 156/156 |
| 8,430,984 B2 * | 4/2013 | Lee et al. | 156/175 |
| 8,800,953 B2 * | 8/2014 | Morris et al. | 249/178 |
| 2005/0211843 A1 | 9/2005 | Simpson et al. | |
| 2005/0258575 A1 | 11/2005 | Kruse et al. | |
| 2007/0107832 A1 | 5/2007 | Frantz et al. | |
| 2007/0221820 A1 | 9/2007 | Wyett | |
| 2008/0029644 A1 | 2/2008 | Martinez Cerezo et al. | |
| 2009/0166921 A1 | 7/2009 | Jacob et al. | |
| 2010/0139850 A1 | 6/2010 | Morris et al. | |
| 2010/0139857 A1 | 6/2010 | Pham et al. | |
| 2010/0222165 A1 * | 9/2010 | Nurnberg et al. | 473/609 |
| 2011/0027405 A1 | 2/2011 | Hanson et al. | |
| 2013/0022702 A1 | 1/2013 | Morris et al. | |

FOREIGN PATENT DOCUMENTS

| | | | |
|---|---|---|---|
| FR | 2607852 A1 | 6/1988 | |
| FR | 2612833 A1 * | 9/1988 | B29D 1/00 |

OTHER PUBLICATIONS

Final Office Action, dated Mar. 2, 2012, regarding U.S. Appl. No. 12/332,093, 7 pages.

Notice of Allowance, dated Jun. 19, 2012, regarding U.S. Appl. No. 12/332,093, 13 pages.

Office Action, dated May 6, 2013, regarding U.S. Appl. No. 13/626,064, 24 pages.

Final Office Action, dated Oct. 9, 2013, regarding U.S. Appl. No. 13/626,064, 13 pages.

Office Action, dated Feb. 24, 2014, regarding U.S. Appl. No. 13/626,064, 12 pages.

Notice of Allowance, dated Apr. 1, 2014, regarding U.S. Appl. No. 13/626,064, 7 pages.

Office Action, dated Feb. 2, 2011, regarding U.S. Appl. No. 12/332,190, 12 pages.

Final Office Action, dated Aug. 2, 2011, regarding U.S. Appl. No. 12/332,190, 12 pages.

Office Action, dated Jan. 3, 2012, regarding U.S. Appl. No. 12/332,190, 4 pages.

Final Office Action, dated Jun. 8, 2012, regarding U.S. Appl. No. 12/332,190, 11 pages.

Office Action, dated Apr. 10, 2015, regarding U.S. Appl. No. 12/332,190, 25 pages.

* cited by examiner

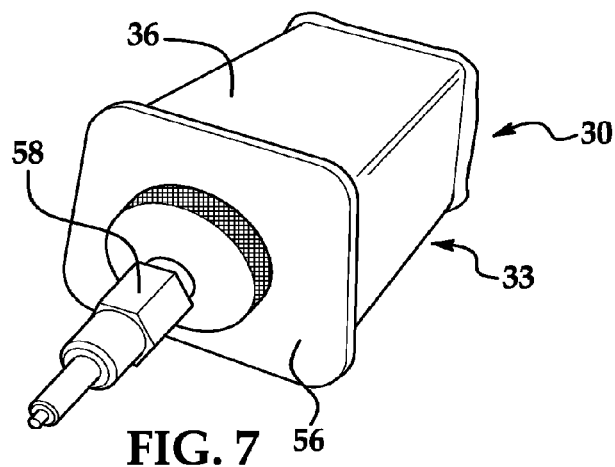
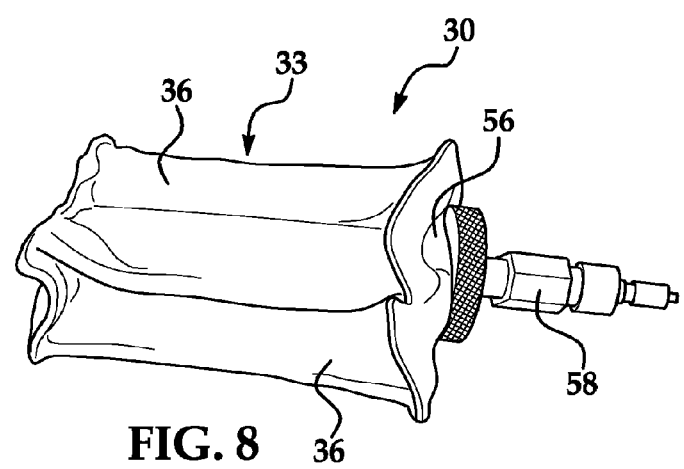
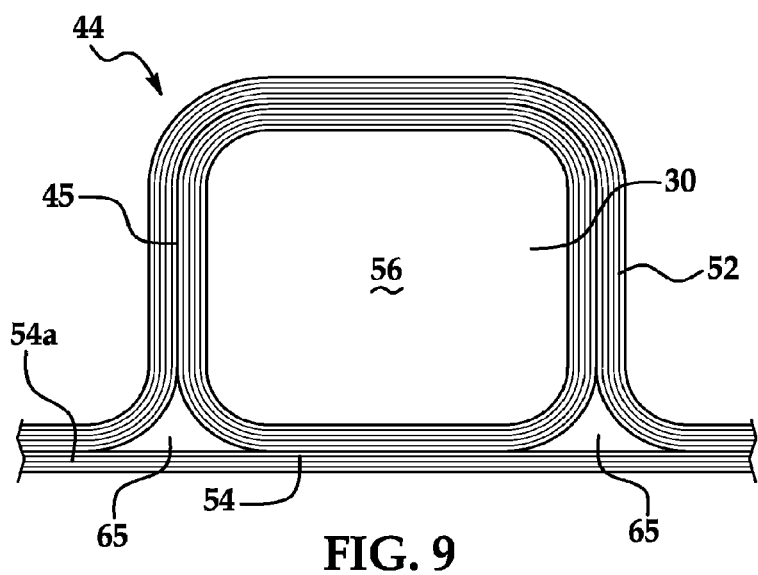

METHOD FOR PRODUCING COMPOSITE LAMINATES USING A COLLAPSIBLE MANDREL

This application is a divisional of U.S. application Ser. No. 13/626,064, filed on Sep. 25, 2012, entitled "Collapsible Mandrel and Method for Producing Composite Laminates Using the Same" which is now U.S. Pat. No. 8,800,953 issued Aug. 12, 2014. U.S. Pat. No. 8,800,953 is itself a DIVISIONAL of U.S. patent application Ser. No. 12/332,093, entitled "Method for Producing Composite Laminates Using a Collapsible Mandrel," filed Dec. 10, 2008, now U.S. Pat. No. 8,293,051, issued Oct. 23, 2012. U.S. Pat. No. 8,293,051 is related to co-pending U.S. application Ser. No. 12/332,190, entitled "Bagging Process and Mandrel for Fabrication of Elongated Composite Structure," filed Dec. 10, 2008. Each of the above are hereby incorporated herein by reference.

TECHNICAL FIELD

This disclosure generally relates to methods and equipment for producing composite laminates, and deals more particularly with a collapsible mandrel used in forming and/or curing composite laminates.

BACKGROUND

Inflatable bladders are sometimes used as mandrels to produce enclosed fiber reinforced polymer parts. Multiple plies of fiber reinforced polymer plies are laid up over the mandrel in order to form the plies into a desired part shape. The mandrel may be removed from the layup either after the layup is compacted and/or cured by deflating the bladder which allows the mandrel to collapse.

A problem sometimes exists in removing the collapsed mandrel which typically has flexible walls, because the mandrel may widen or expand along natural folding points. This widening effect may have the consequence of locking the mandrel within the inside walls of the compacted layup or the cured part. This mandrel lock-in may be particularly problematic in layups or parts having non-uniform cross sections presenting features such as joggles and/or bends that engage and interfere with withdrawl of the widened mandrel. Mandrel lock-in may also be a problem in applications where the part has a uniform cross section but is relatively long, such as without limitation, an aircraft fuselage or a stringer, and may be due to the friction between the mandrel and the part.

Accordingly, there is a need for a collapsible mandrel that may not widen as it is being collapsed, thus allowing it to be more easily removed after a part has been laid-up and/or cured. There is also a need for a method of fabricating composite parts using such a mandrel.

SUMMARY

In accordance with the disclosed embodiments, a collapsible mandrel includes an inflatable bladder having internal structure that reduces the tendency of the bladder to widen as it is being deflated. The cross sectional dimensions of the bladder may reduce in all directions as it collapses during deflation, thus allowing it to be removed from a part without interference from internal surfaces or features of the part. The disclosed mandrel may be employed to produce a variety of composite parts having complex shapes and/or non-uniform cross sections along their length that may be easily extracted after a part has been cured. The mandrel may provide structure and support during green part layup and may provide the proper shape and autoclave pressure during cure while capable of being collapsed under applied vacuum for ease of extraction from an enclosed part. The mandrel can be used as a tube bag mandrel in which the collapsible bladder is removed after bagging and only the bag goes through the cure process.

According to one disclosed embodiment, a collapsible bladder comprises flexible outer walls forming a collapsible enclosure. At least one strut inside the enclosure contacts the outer walls for controlling the shape in which the enclosure may be collapsed. The walls may form corners and the strut may be connected to one of the corners for restraining the corner against outward displacement.

According to another disclosed embodiment, a collapsible mandrel comprises an inflatable pressure bladder. The bladder includes flexible walls and natural folding points along which the bladder may fold as it is being collapsed. Means are provided for restraining the natural folding points during collapse of the bladder. The restraining means may include a plurality of flexible struts connecting the folding points to a central region of the bladder.

According to a further embodiment, a collapsible mandrel is provided for compacting composite laminates. The mandrel includes an inflatable bladder having flexible walls that allow collapse to allow removal of the bladder from a compacted laminate layup. A plurality of struts inside the bladder are connected to the flexible walls and function to restrain the walls against widening within the layup as the bladder is being collapsed. The bladder includes natural folding points along which the bladder collapses. The struts may contact or be connected to the walls at the natural folding points. In one embodiment, the bladder and the struts may be of substantially unitary construction.

According to a disclosed method embodiment, producing a composite laminate comprises inflating a bladder. A layup is formed by laying up plies of uncured composite material over the inflated bladder. The plies are compacted against the inflated bladder. The bladder is deflated after the plies have been compacted. During the deflation of the bladder, the walls of the bladder are restrained against widening. The bladder is removed from the compacted layup after the bladder has been deflated. Restraining the walls against widening may include connecting natural folding points of the bladder to a central region of the bladder by attaching struts to the natural folding points and to each other.

The disclosed embodiments satisfy the need for a collapsible mandrel that may not widen as it is being collapsed, thereby allowing easy removal of the mandrel from a part even where the part has a non-uniform cross section.

BRIEF DESCRIPTION OF THE ILLUSTRATIONS

FIG. 7 is a perspective view of an inflated mandrel in accordance with the disclosed embodiments.

FIG. 8 is a perspective view of the mandrel shown in FIG. 7, but having been partially collapsed.

FIG. 9 is a cross sectional view of a part layup used to form one of the struts shown in FIG. 2 and illustrating the mandrel in a fully inflated state.

DETAILED DESCRIPTION

Figure 1:
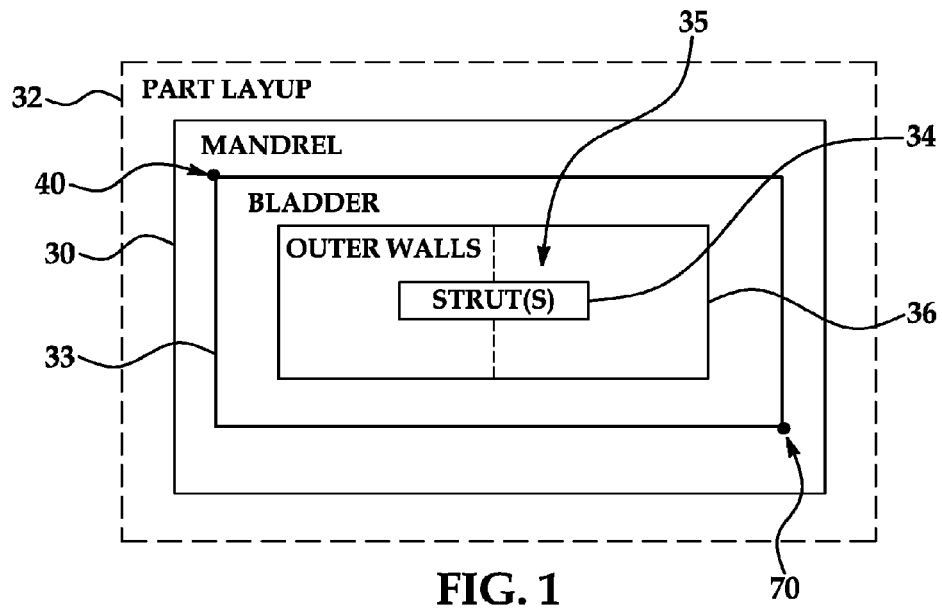
FIG. 1 is a functional block diagram of a collapsible mandrel for forming, compacting and/or curing a composite layup.

Referring first to FIG. 1, a collapsible mandrel 30 may be used to form and/or cure a part layup 32 comprising multiple plies (not shown) of fiber reinforced polymer resin. The part layup 32 may partially or fully surround the mandrel 30, such that the mandrel is at least substantially enclosed by the part layup 32. The mandrel 30 includes an inflatable bladder 33 having flexible outer walls 36 forming an enclosure that may collapse inwardly at natural folding points 70 when the bladder 33 is deflated in order to allow the mandrel 30 to be withdrawn from the part layup 32.

The bladder 33 further includes at least one strut connected between one of the outer walls 30 and a central region 35 within the bladder 33. The strut 34 restrains the bladder 33 against expansion or widening as the bladder 33 is being deflated in order to prevent the deflated and/or collapsed mandrel 30 from being wedged or locked within the part layup 32.

The part layup 32 may be cured to form any of a variety of composite structures or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles. A typical example of a composite structure that may benefit from use of a collapsible mandrel 30 to form a part layup is illustrated in FIGS. 2-6. An aircraft wing structure 38 comprises front and rear spars 40, 42 respectively, connected by a series of ribs 46 longitudinally spaced along the length of the structure 38. The structure 38 is stiffened by a series of stringers 44 which are connected to the ribs 46. In the illustrated example, the stringers 44 are vent stringers that may function to vent fuel vapors from areas of fuel tanks (not shown) toward the outer end 55 of the wing structure 38 where they are vented to the atmosphere.

Figure 2:
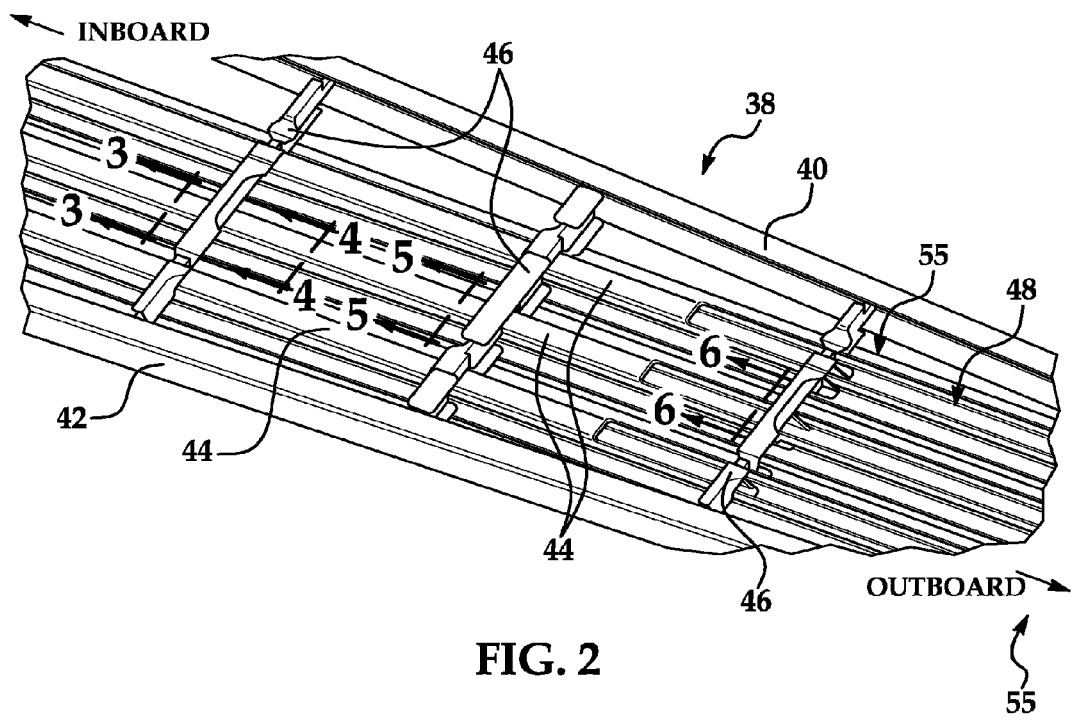
FIG. 2 is a perspective view of an aircraft wing frame showing stringers having non-uniform cross sections along their lengths.
Figure 3:
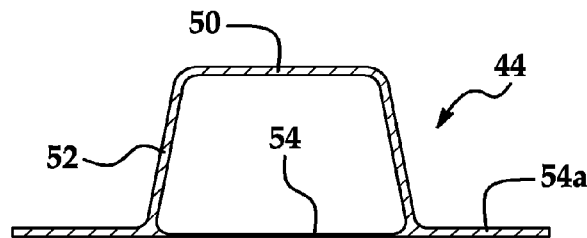
FIG. 3 is a sectional view taken along the line 3-3 in FIG. 2.
Figure 4:
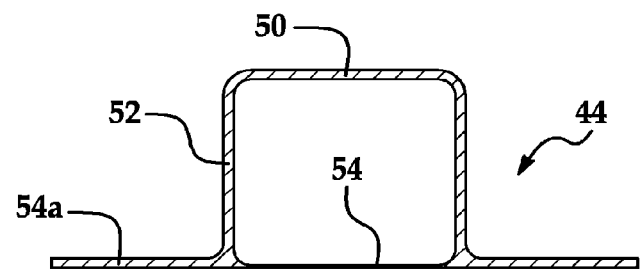
FIG. 4 is a sectional view taken along the line 4-4 in FIG. 2.
Figure 5:
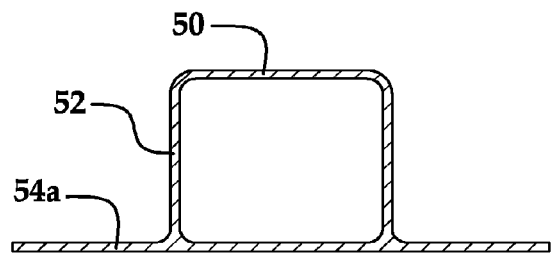
FIG. 5 is a sectional view taken along the line 5-5 in FIG. 2.
Figure 6:
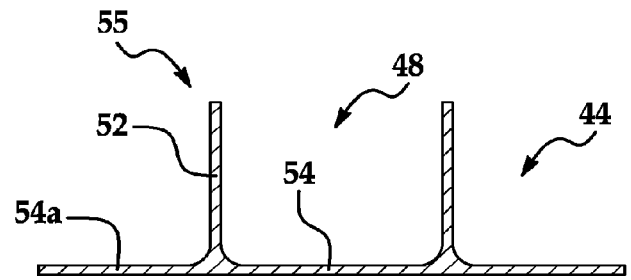
FIG. 6 is a sectional view taken along the line 6-6 in FIG. 2.

Each of the stringers 44 includes a top 50, sides 52 and a bottom 54. Bottom 54 includes outwardly extending flanges 54a. As best seen in FIGS. 3-6, the cross sectional geometry of the stringer 44 varies along its length. For example, at one point indicated by the section line 3-3 in FIG. 2, the walls 52 are inclined with respect to the flanges 54a, and the bottom 54 has a reduced thickness compared to the flanges 54a. Slightly further along the length of the structure 38, as shown by the section line 4-4 in FIG. 2, the walls 52 transition to a vertical orientation, substantially perpendicular to the flanges 54a. Still further along the length of the stringer 44, as shown in FIG. 5, the bottom 54 transitions to a greater thickness, compared to the thickness of the bottom shown in FIGS. 3 and 4. Finally, as shown in FIGS. 2 and 6, the outer ends 55 of the stringers 44 have an open top indicated by the numeral 48. From the forgoing, it can be appreciated that a mandrel 30 used to form a composite layup 32 in the shape of the stringer 44 may conform to a series of different cross sectional geometries along the length of the stringer 44.

Attention is now directed to FIGS. 7 and 8 which illustrate further details of a collapsible mandrel 30 suitable, for example, for use in fabricating the stringers shown in FIGS. 2-6. The mandrel 30 includes an inflatable bladder 33 and a fluid fitting 58 through which a fluid, which may be a gas or liquid, may flow in order to inflate or deflate the bladder 33. The bladder 33 may include four side walls 36 and a pair of end walls 56 forming a unitary but flexible enclosure. In FIG. 7, the bladder 33 is fully inflated, whereas in FIG. 8 the bladder 33 has been partially deflated so that the mandrel 30 is partially collapsed.

FIG. 9 is a cross sectional view showing the mandrel of FIGS. 7 and 8 with plies 45 having been laid up over and around the mandrel 30 to form the stringer 44. Open radius areas 65 may be filled with fillers (not shown) also sometimes referred to as "noodles".

Figure 10:
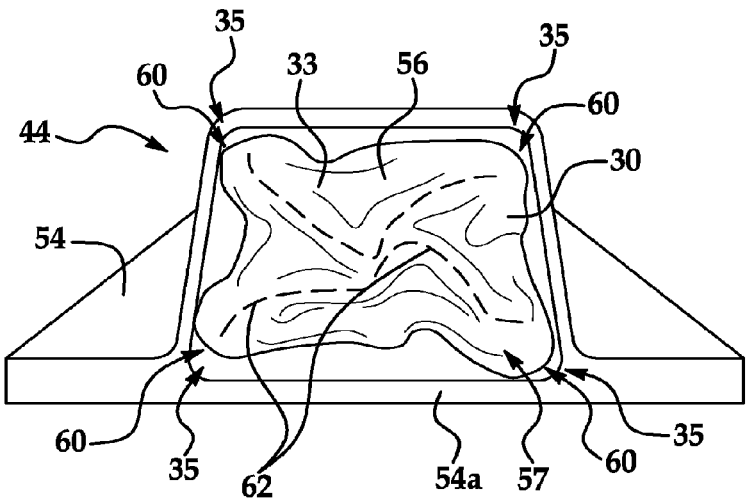
FIG. 10 is an isometric view of a collapsed mandrel before extraction from one of the stringers shown in FIG. 2.

FIG. 10 illustrates a stringer 44 having been formed and cured using the collapsible mandrel 30. The mandrel 30 is shown in a partially collapsed condition 57, in which it may be removed from the interior of the stringer 44, or installed within a layup of the stringer 44 prior to consolidation and curing. Later discussed struts 62 inside the bladder 33 are designated by the broken line 62. From FIG. 10, it can be seen that the corners 60 of the bladder have retreated slightly from the inside corners 35 of the stringer 44, allowing the mandrel 30 to be easily withdrawn from the stringer 44.

Figure 11:
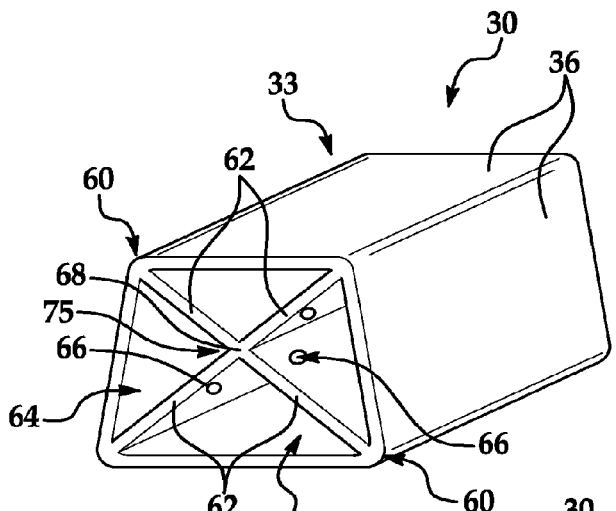
FIG. 11 is a perspective view of a collapsible mandrel, partially sectioned to show the internal structure of the mandrel.
Figure 12:
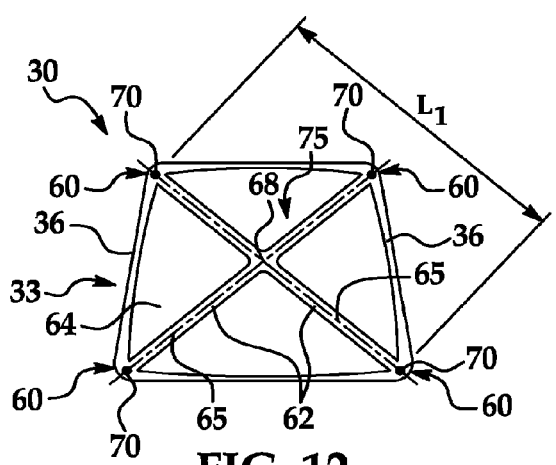
FIG. 12 is an end view of the mandrel shown in FIG. 11 in a fully inflated state.

Attention is now directed to FIGS. 11 and 12 which show additional details of the mandrel 30, including the bladder 33. The bladder 33 includes a generally hollow interior 75 and at least one strut 62 inside the bladder 33 that is connected between a central region 75 and one of the walls 36. In the illustrated example, four intersecting struts 62 are provided having one of their ends connected together at the center 68 of the inflated bladder 33, while the other end of each of the struts 62 is connected to a corner 60 formed by adjoining walls 36. The corners 60 may form natural folding points 70 about which the bladder 33 naturally folds when it is collapsed during deflation. Thus, the bladder 33 may fold along either or both the lines 65 connecting the folding points defined by the corners 60.

Normally, in the absence of the struts 62, collapse of the mandrel 30 may result in the corners 62 and/or the walls 36 of the bladder 33 widening or expanding in a pancake-like manner, forcing the corners 60 and/or the walls 36 against the inside of stringer 44, and particularly corners 35 (FIG. 10) of the stringer 44. In accordance with the disclosed embodiments, however, the struts 62 may control the shape into which the bladder 33 collapses when evacuated and/or negative pressure is applied to the interior 64 of the bladder 33. The deflated shape may be controlled by restraining outward displacement of the corners 60 along the folding lines 56. This restraint may be a result of the natural folding points 70, i.e. the corners 60 being structurally connected and thus "pinned" in a central region 75 of the bladder 33, which may be the center 68 bladder 33.

Generally, the location and number of the natural folding points 70 will depend on the particular cross sectional geometry of the bladder 33, consequently the number and location of the struts 62 may vary accordingly. The struts 62 may be integrally formed with the bladder walls 36, 56 so that the bladder 33 is of unitary construction. However, in some embodiments, the struts 62 may be a structure or body that is disposed within, but is separate from the bladder 33. For example, the struts 62 may comprise one or more simple rods (not shown) extending down the center of the bladder 33 which change the folding points of the bladder 33 from the natural folding points as the walls 36 of the bladder 33 collapse and come into contact with the rod. The bladder 33 and/or the struts 62 may be formed, for example and without limitation, from flexible silicon rubber. Thus, the struts 62, which may run substantially the entire length of the bladder 33, are readily flexible, and thus may flex and deform as the mandrel 30 is being collapsed.

Figure 13:
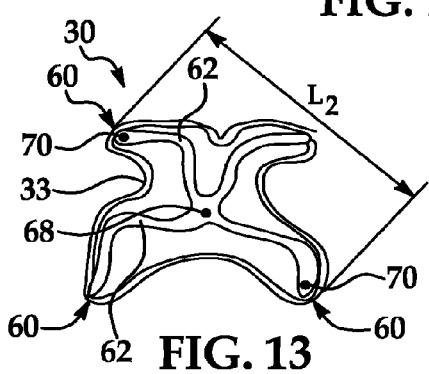
FIG. 13 is a view similar to FIG. 12 but showing the mandrel in a collapsed state.

FIG. 13 shows the bladder 33 having been deflated so that the mandrel 30 is partially collapsed. Collapse of the mandrel 30 results in opposite ones of the corners 60 drawing slightly toward each other, thereby retreating away from the inside corners 35 (FIG. 10) of the stringer 44, allowing the mandrel 30 to be easily withdrawn from the stringer 44. By restraining the natural folding points 70 against expansion during the deflation process, the distance $L_2$ between folding points 70 of the deflated bladder 33 is less than the distance $L_1$ between the folding points 70 when the bladder 33 is fully inflated. The configuration of the struts 62 is such that the mandrel 30 may become smaller in all directions upon evacuation and/or at least partial deflation of the internal volume of the bladder 33. The struts 62 are connected to the bladder walls 36 in a way that the internal atmospheric or autoclave pressure may be applied substantially normal to the surface of the walls 36, or has features that approximate equal load distribution.

Figure 14:
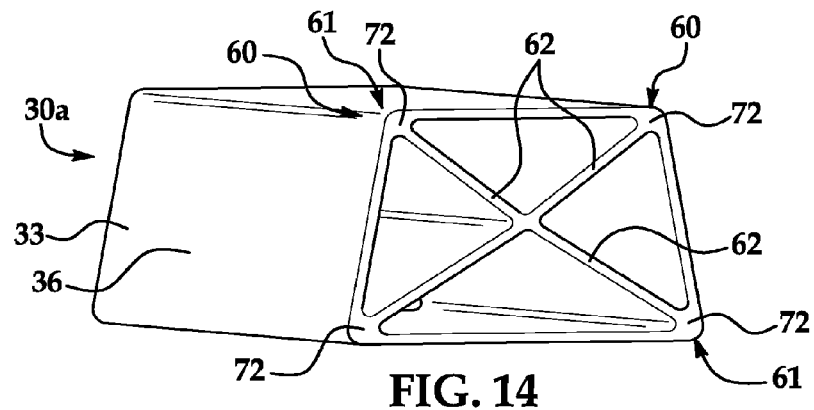
FIG. 14 is a perspective view of an alternate form of the collapsible mandrel, partially in section to reveal the internal structure of the mandrel.

Reference is now made to FIG. 14 which illustrates an alternate embodiment 30a of the mandrel 30. Each of the outer corners 60 of the bladder 33 has an outer surface radius 61 that may apply less pressure to the part layup 32 due to its reduced surface area compared to the walls 36. To compensate for the reduced surface area of the outer surface radius 61 at the corners 60 of the bladder 33, the bladder 33 may include integrated interior pressure bulbs 72 at each corner 60 that are close to the inverse of the part side radii 35 (FIG. 10). The pressure bulbs 72 result in the surface area on the pressure side of the bladder 33 being close to that of the part (stringer 44) side, which may minimize the possibility of resin migration during low viscous phases of the cure cycle. In this embodiment, the struts 62 are connected to the corners 60 at the pressure bulbs 72.

Figure 15:
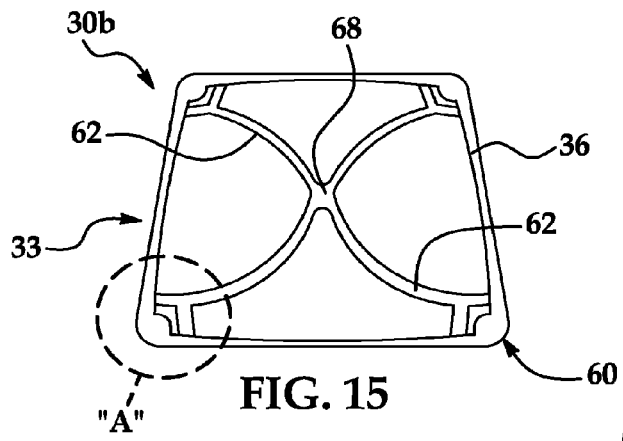
FIG. 15 is a cross sectional view of an alternate form of the collapsible mandrel.
Figure 16:
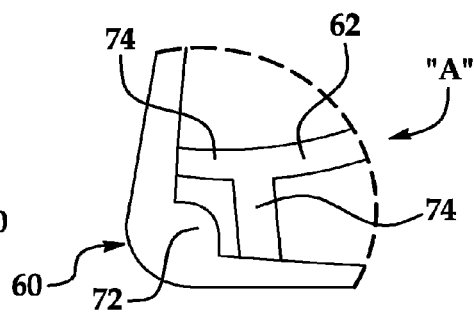
FIG. 16 is an enlarged view of the area designated as "A" in FIG. 15.

Attention is now directed to FIGS. 15 and 16 which depict another embodiment 30b of the mandrel. In this embodiment, the struts 62 are slightly curved in order to predispose the struts 62 and thus the walls 36 of the bladder 33 to collapse more readily, in a repeatable, predictable manner. Further, the outer ends of the struts include first and second leg portions 74 which are joined to adjacent walls 36 and straddle a corner 60. In this embodiment, each of the corners 62 includes a pressure bulb 72 between the leg portions 74 of the struts 62.

Figure 17:
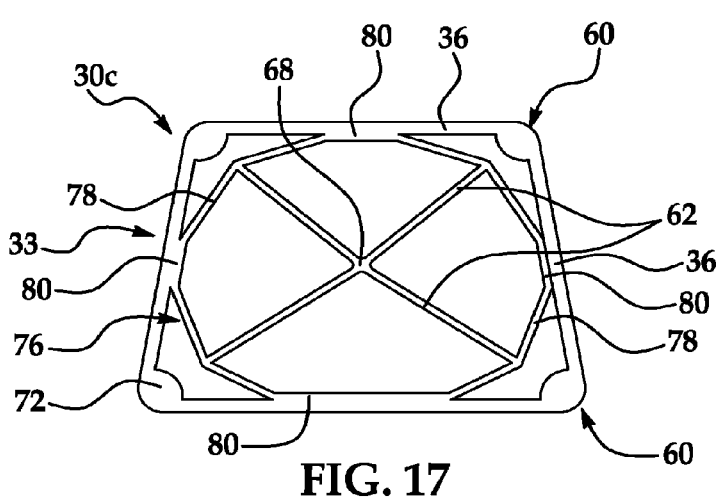
FIG. 17 is a cross sectional view of a further embodiment of the collapsible mandrel.

FIG. 17 shows a further embodiment 30c of the mandrel 30 in which the struts 62 are connected between the center 68 of the bladder 33 and a load ring 76 comprising a series of outer struts 78. The outer struts 78 are connected to inner struts 62 and to the midpoints 80 of the walls 36. The load ring 76 functions to more evenly load the walls 36 so that the mandrel bladder 30 collapses inwardly at the midpoints 36, following which the corners collapse away from the inside corners 35 (FIG. 10) of the stringer 44.

Figure 18:
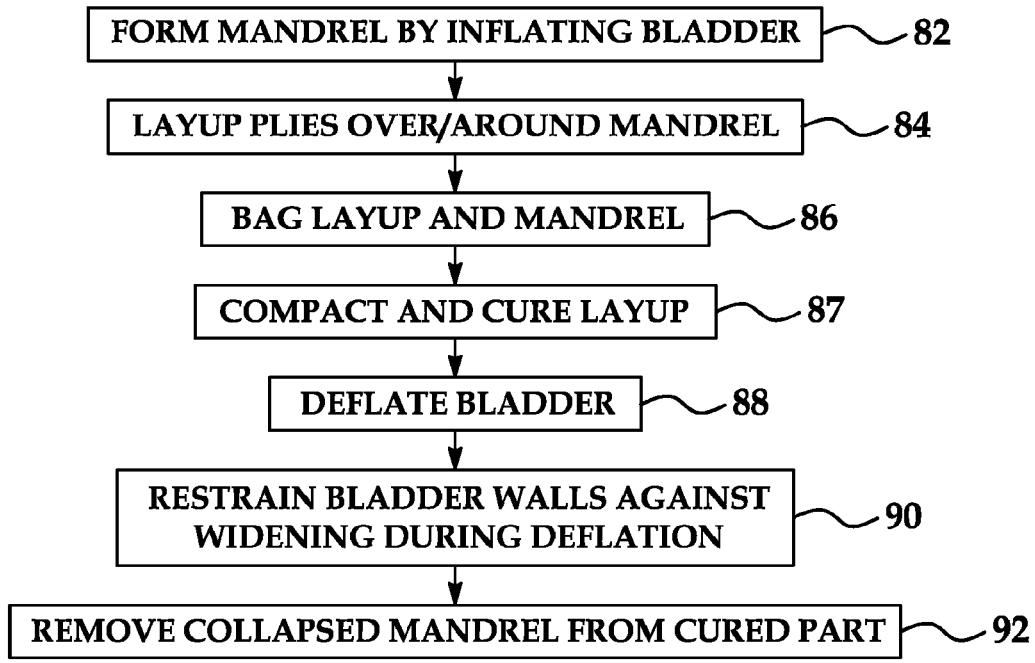
FIG. 18 is a flow diagram of a method for producing composite parts using the collapsible mandrel.

Attention is now directed to FIG. 18 which illustrates the broad steps of a method of using the mandrel 30 to produce a composite part. Beginning at 82, the mandrel 30 is formed by inflating the bladder 33 using any suitable fluid, including but not limited to air. Next at 84, composite plies 45 are laid up on and/or around the mandrel 30. Then at 86, the resulting part layup and the mandrel 30 are enclosed in a vacuum bag (not shown) following which the part layup is compacted and cured at 87. Next at 88, the bladder 33 is deflated in order to collapse the mandrel 30. As the bladder 33 is being deflated, the bladder walls 36, including the corners 60 are restrained against widening, as shown at step 90. Last, at 92, the collapsed mandrel 30 is removed from the cured part.

Figure 19:
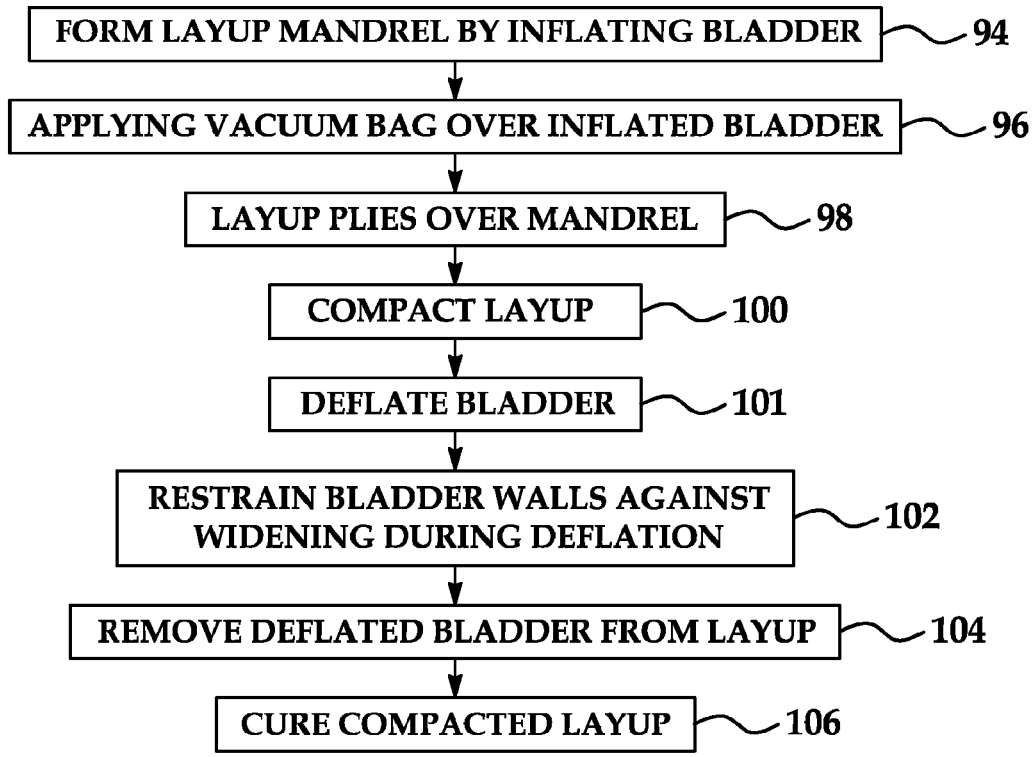
FIG. 19 is a flow diagram illustrating a method of producing composite parts in which the inflatable mandrel is used as a tube bag for forming and compacting a part layup.

FIG. 19 illustrates the steps of a method for producing a composite part using the inflatable bladder 33 as a tool to form and compact a part layup, but wherein the bladder 33 is removed prior to cure. Beginning at 94, a tool mandrel 30 is formed by inflating the bladder 33, following which a vacuum bag is applied over the inflated bladder 33, as shown at 96. Next, at 98, composite plies are laid up over the tool mandrel 30, following which the layup is compacted at 100. Next, the bladder 33 is deflated during which the bladder walls 36 are restrained against widening as shown at 102. The deflated bladder 33 is then removed from part layup at 104, following which the compacted layup may be cured at 106.

Figure 20:
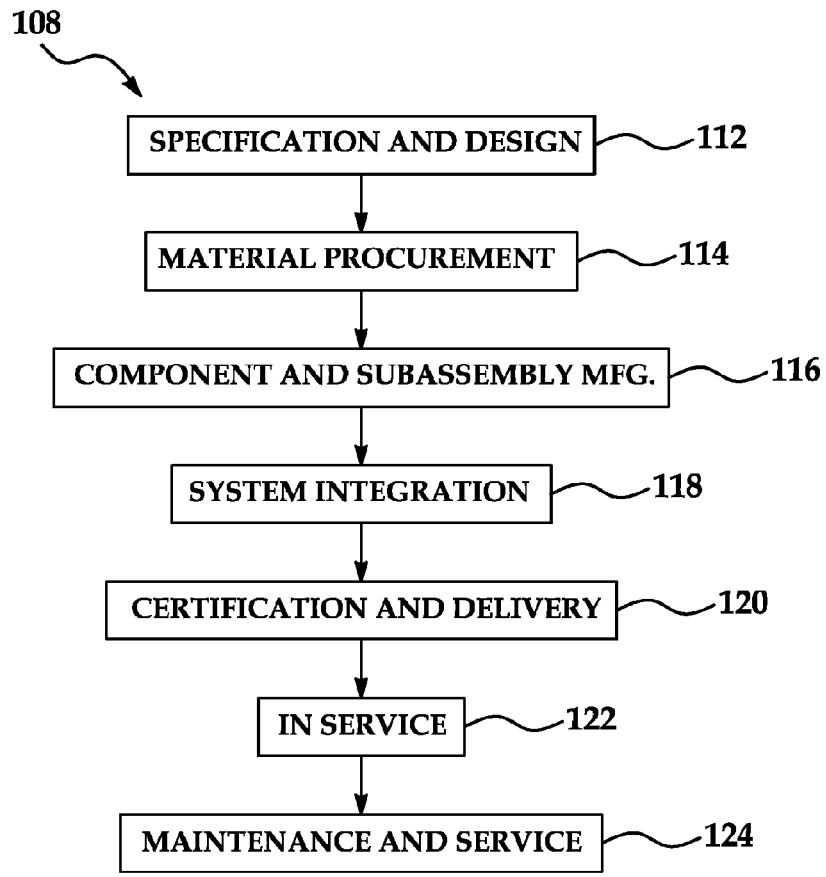
FIG. 20 is a flow diagram of aircraft production and service methodology.
Figure 21:
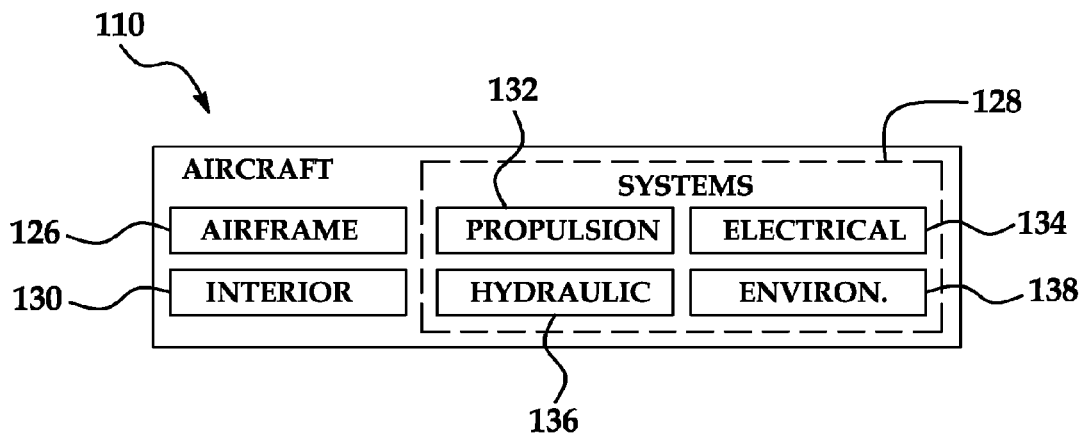
FIG. 21 is a block diagram of an aircraft.

Embodiments of the disclosure may find use in a variety of potential applications, particularly in the transportation industry, including for example, aerospace, marine and automotive applications. Thus, referring now to FIGS. 20 and 21, embodiments of the disclosure may be used in the context of an aircraft manufacturing and service method 108 as shown in FIG. 20 and an aircraft 110 as shown in FIG. 21. During pre-production, exemplary method 108 may include specification and design 112 of the aircraft 110 and material procurement 114. During production, component and subassembly manufacturing 116 and system integration 118 of the aircraft 110 takes place. Thereafter, the aircraft 110 may go through certification and delivery 120 in order to be placed in service 122. While in service by a customer, the aircraft 110 is scheduled for routine maintenance and service 416 (which may also include modification, reconfiguration, refurbishment, and so on).

Each of the processes of method 108 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 21, the aircraft 110 produced by exemplary method 108 may include an airframe 126 with a plurality of systems 128 and an interior 130. Examples of high-level systems 128 include one or more of a propulsion system 132, an electrical system 134, a hydraulic system 136, and an environmental system 138. Any number of other systems may be included. Although an aerospace example is shown, the principles of the disclosure may be applied to other industries, such as the marine and automotive industries.

Systems and methods embodied herein may be employed during any one or more of the stages of the production and service method 108. For example, components or subassemblies corresponding to production process 108 may be fabricated or manufactured in a manner similar to components or subassemblies produced while the aircraft 110 is in service. Also, one or more apparatus embodiments, method embodiments, or a combination thereof may be utilized during the production stages 116 and 118, for example, by substantially expediting assembly of or reducing the cost of an aircraft 110. Similarly, one or more of apparatus embodiments, method embodiments, or a combination thereof may be utilized while the aircraft 110 is in service, for example and without limitation, to maintenance and service 124.

Although the embodiments of this disclosure have been described with respect to certain exemplary embodiments, it is to be understood that the specific embodiments are for purposes of illustration and not limitation, as other variations will occur to those of skill in the art.

What is claimed:

1. A collapsible bladder, comprising:
   flexible outer walls that comprise an enclosure, such that the flexible outer walls form at least one corner, and the at least one corner comprises a pressure bulb; and
   a first strut inside the enclosure directly connected to a second strut inside the enclosure, each strut being directly connected to a flexible outer wall of the flexible outer walls, such that in operation, the first strut and the second strut control a shape into which the enclosure collapses.

2. The collapsible bladder of claim 1,
   further comprising the at least one strut is connected to the at least one corner in an area of the pressure bulb.

3. The collapsible bladder of claim 2, wherein:
   the corner has an outer surface radius, and
   the pressure bulb has a radius generally matching a surface area of the outer surface radius of the corner.

4. The collapsible bladder of claim 2, wherein:
   adjacent flexible outer walls form corners, and
   at least one strut comprises a first portion and a second portion respectively: joined to the adjacent flexible outer walls, and spanning one of the corners.

5. The collapsible bladder of claim 1, further comprising:
   a first plurality of struts connected together in a ring joined to the walls, and
   a second plurality of struts disposed within and connected to the ring.

6. The collapsible bladder of claim 1, further comprising a plurality of flexible struts connecting folding points in a central region of the bladder.

7. A collapsible mandrel, comprising:
   an inflatable pressure bladder comprising: flexible walls, and folding points along which the inflatable pressure bladder folds as the inflatable pressure bladder collapses, each folding point in the folding points comprising a pressure bulb, respectively; and
   a first strut and a second strut, each strut directly connected to each other and to a respective flexible wall of the flexible walls, and configured such that, in operation, the first strut and the second strut restrain outward displacement of the folding points as the inflatable pressure bladder collapses.

8. The collapsible mandrel of claim 7, wherein the collapsible mandrel comprises a plurality of flexible struts connecting the folding points in a central region of the inflatable pressure bladder.

9. The collapsible mandrel of claim 8, wherein:
   the flexible walls form corners defining the folding points, and
   the plurality of flexible struts connecting the corners with the central region of the inflatable pressure bladder.

10. The collapsible mandrel of claim 9, further comprising each pressure bulb configured equalize an interior surface area of the inflatable pressure bladder with an exterior surface area of the inflatable pressure bladder and minimize a resin migration during low viscous phases of a cure cycle.

11. The collapsible mandrel of claim 7, further comprising:
    a first plurality of struts connected together in a ring joined to the flexible walls, and
    a second plurality of the struts disposed within and connected to the ring.

12. The collapsible mandrel of claim 7, wherein:
    a number of outer walls form at least one corner,
    the at least one corner includes at least one pressure bulb, and
    at least one strut is connected to the at least one corner in an area of the pressure bulb.

13. The collapsible mandrel of claim 12, wherein:
    the at least one corner has an outer surface radius, and
    the pressure bulb has a radius generally matching a surface area of the outer surface radius of the corner.

14. The collapsible mandrel of claim 12, wherein:
    adjacent outer walls form corners, and
    the at least one strut includes first and second strut portions respectively joined to the adjacent outer walls and spanning one of the corners.

15. A collapsible mandrel used to compact and cure a composite part, comprising:
    a bladder adapted to be inflated and comprising: a length, and a width, the bladder comprising flexible walls and natural folding points along which the flexible walls fold as the bladder is being deflated;
    a plurality of flexible struts inside of and extending substantially an entire length of the bladder, each of the struts having a first end connected to one of the natural folding points, and a second end, the second end of each strut being directly connected together at a center of the bladder;
    the walls forming corners in the bladder, and comprising pressure bulbs for distributing force applied to the corners by the struts to the walls of the bladder, each of the struts comprising a first portion connected to a first wall, and a second portion connected to a second wall adjacent to the first wall, such that the first wall and the second wall form a corner of the corners in the bladder.

16. The collapsible mandrel of claim 15, further comprising:
    a first plurality of the struts connected together in a ring joined to the walls, and
    a second plurality of the struts disposed within and connected to the ring.

17. The collapsible mandrel of claim 15, wherein:
    a number of outer walls form at least one corner,
    the at least one corner includes a pressure bulb, and
    at least one strut is connected to the at least one corner in an area of the pressure bulb.

18. The collapsible mandrel of claim 17, wherein:
    the at least one corner has an outer surface radius, and the pressure bulb has a radius generally matching a surface area of the outer surface radius of the corner.

19. The collapsible mandrel of claim 17, wherein:

adjacent outer walls form corners, and the at least one strut includes first and second strut portions respectively joined to adjacent ones of the walls and spanning one of the corners.

20. The collapsible mandrel of claim 15, further comprising the plurality of flexible struts connecting the folding points in a central region of the bladder.

\* \* \* \* \*